(12) United States Patent
Chen et al.

(10) Patent No.: US 12,489,807 B2
(45) Date of Patent: Dec. 2, 2025

(54) METHOD AND SYSTEM FOR SECURE FILE SHARING BASED ON DOMESTIC CRYPTOGRAPHIC ALGORITHM

(71) Applicant: OnlyOwner Technology Limited, Hong Kong (CN)

(72) Inventors: Hong Chen, Hong Kong (CN); Zhongkui Liu, Hong Kong (CN); Yabin Zhang, Hong Kong (CN)

(73) Assignee: ONLYOWNER TECHNOLOGY LIMITED, Hong Kong (CN)

( * ) Notice: Subject to any disclaimer, the term of this patent is extended or adjusted under 35 U.S.C. 154(b) by 58 days.

(21) Appl. No.: 18/553,926

(22) PCT Filed: Nov. 4, 2022

(86) PCT No.: PCT/CN2022/129708
§ 371 (c)(1),
(2) Date: Oct. 4, 2023

(87) PCT Pub. No.: WO2023/098390
PCT Pub. Date: Jun. 8, 2023

(65) Prior Publication Data
US 2024/0187477 A1  Jun. 6, 2024

(30) Foreign Application Priority Data

Nov. 30, 2021 (CN) .......................... 202111438791.2

(51) Int. Cl.
*H04L 9/32* (2006.01)
*H04L 9/30* (2006.01)
(Continued)

(52) U.S. Cl.
CPC ................ *H04L 67/06* (2013.01); *H04L 9/30* (2013.01)

(58) Field of Classification Search
CPC ......... H04L 67/06; H04L 9/30; H04L 9/0643; H04L 9/0819; H04L 9/14; H04L 9/3247; H04L 63/045; H04L 63/062; G06F 16/176
See application file for complete search history.

(56) References Cited

U.S. PATENT DOCUMENTS

| | | | |
|---|---|---|---|
| 9,774,578 B1 * | 9/2017 | Ateniese | ............... G06F 3/0673 |
| 2013/0185812 A1 | 7/2013 | Lie et al. | |

(Continued)

FOREIGN PATENT DOCUMENTS

| | | |
|---|---|---|
| CN | 101989984 A | 3/2011 |
| CN | 108696360 A | 10/2018 |

(Continued)

OTHER PUBLICATIONS

Xin Zheng, Chongyao Xu, Xianghong Hu, Yun Zhang, and Xiaoming Xiong; "The Software/Hardware Co-Design and Implementation of SM2/3/4 Encryption/Decryption and Digital Signature System"; IEEE Transactions on CAD of IC and Systems, vol. 39, No. 10, Oct. 2020; pp. 2055-2065 (Year: 2020).*

*Primary Examiner* — Fatoumata Traore
*Assistant Examiner* — Courtney D Fields
(74) *Attorney, Agent, or Firm* — MUNCY, GEISSLER, OLDS & LOWE, P.C.

(57) ABSTRACT

A method and system for secure file sharing based on a domestic cryptographic algorithm including steps: registering, by a user, at a file sharing user terminal A and a file receiving user terminal B, and sending registration information of the user to a key management center; calculating, by the key management center, digest values of usernames a and b, combining the digest values to calculate private keys sa and sb of the user, and sending the private keys to the file sharing user terminal A and the file receiving user terminal B; specifying, by the user, a file f to be shared at the file (Continued)

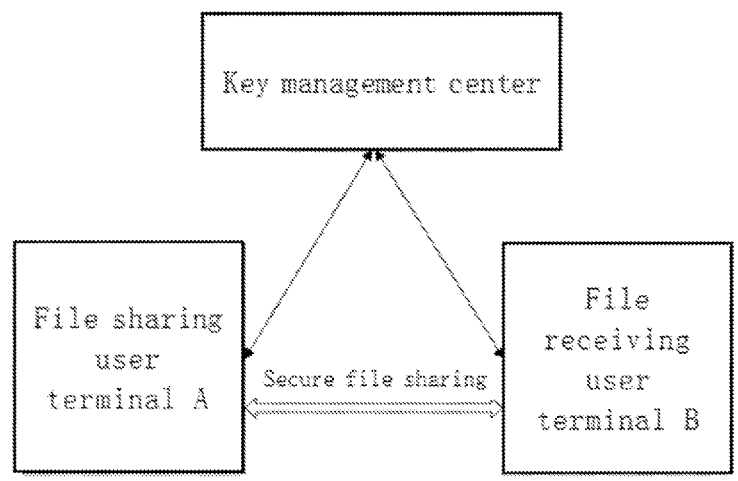

sharing user terminal A, encrypting the file to generate a shared file F, and sharing the shared file; and receiving, by the file receiving user terminal B, the shared file F and then decrypting the shared file to obtain the file f.

7 Claims, 1 Drawing Sheet

(51) Int. Cl.
*H04L 9/40* (2022.01)
*H04L 67/06* (2022.01)
*H04L 9/08* (2006.01)
*H04W 12/041* (2021.01)

(56) References Cited

U.S. PATENT DOCUMENTS

2015/0317487 A1* 11/2015 O'Hare ............... H04L 9/3231
                                                            713/189
2018/0262472 A1*  9/2018 Frederick ............ H04L 9/0819

FOREIGN PATENT DOCUMENTS

| CN | 114205090 A | 3/2022 | | |
| WO | WO-2023283789 A1 * | 1/2023 | ............... | H04L 9/08 |

* cited by examiner

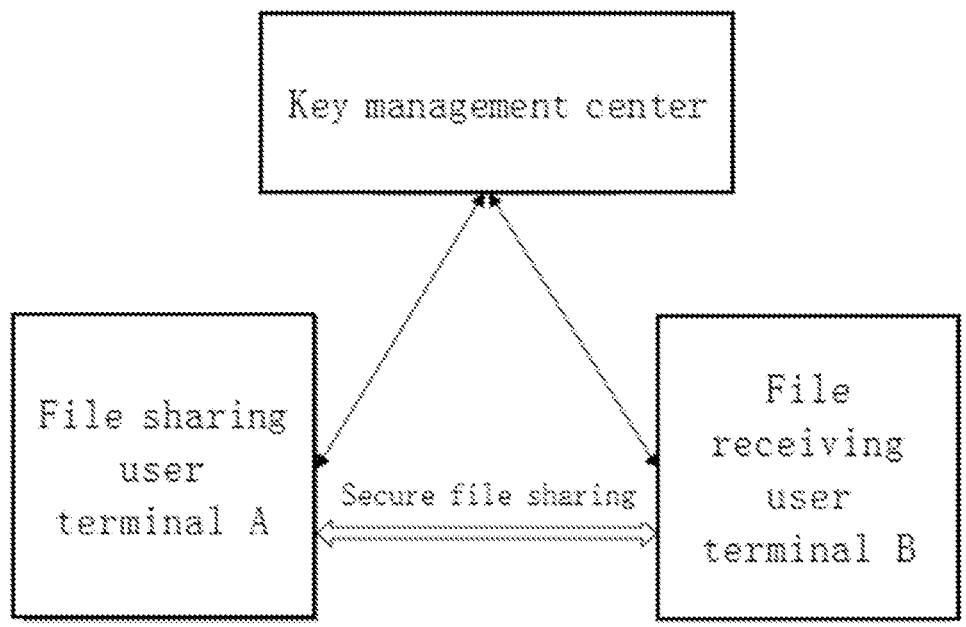

FIG. 1

$$\begin{Bmatrix} p(1,1) & p(1,2) & p(1,3) & p(1,4) \ldots\ldots & p(1,32) \\ p(2,1) & p(2,2) & p(2,3) & p(2,4) \ldots\ldots & p(2,32) \\ p(3,1) & p(3,2) & p(3,3) & p(3,4) \ldots\ldots & p(3,32) \\ p(4,1) & p(4,2) & p(4,3) & p(4,4) \ldots\ldots & p(4,32) \\ p(5,1) & p(5,2) & p(5,3) & p(5,4) \ldots\ldots & p(5,32) \\ \ldots\ldots & & & & \\ p(32,1) & p(32,2) & p(32,3) & p(32,4) \ldots\ldots & p(32,32) \end{Bmatrix}$$

FIG. 2

$$\begin{Bmatrix} s(1,1) & s(1,2) & s(1,3) & s(1,4) \ldots\ldots & s(1,32) \\ s(2,1) & s(2,2) & s(2,3) & s(2,4) \ldots\ldots & s(2,32) \\ s(3,1) & s(3,2) & s(3,3) & s(3,4) \ldots\ldots & s(3,32) \\ s(4,1) & s(4,2) & s(4,3) & s(4,4) \ldots\ldots & s(4,32) \\ s(5,1) & s(5,2) & s(5,3) & s(5,4) \ldots\ldots & s(5,32) \\ \ldots\ldots & & & & \\ s(32,1) & s(32,2) & s(32,3) & s(32,4) \ldots\ldots & s(32,32) \end{Bmatrix}$$

FIG. 3

METHOD AND SYSTEM FOR SECURE FILE SHARING BASED ON DOMESTIC CRYPTOGRAPHIC ALGORITHM

TECHNICAL FIELD

The present disclosure belongs to the field of computer technology security, and particularly relates to a method and system for secure file sharing based on a domestic cryptographic algorithm.

BACKGROUND

With the development of network technologies, it is common to upload or download files through the network, and the technology for uploading or downloading files on personal computers or mobile terminals is mature. Therefore, the file sharing technology has grown up accordingly, but there are still many problems in sending encrypted files to sharing people by using the common sharing technology. For example, if a user A shares a file f with a user B, there are the following drawbacks:
  (1) the user A needs to record a key of an encrypted file;
  (2) the user A needs to send the key to the user B by other means of a telephone, a message, an email, etc.; and
  (3) if the user A needs to share the file with multiple people, the file f needs to be encrypted for multiple times, causing use inconvenience to the user A; or the file is encrypted once but the key is shared with multiple people, resulting in an increased risk of key leakage.

SUMMARY

To solve the problems of security and permission control when a user shares a file, the present disclosure provides a method and system for secure file sharing based on a domestic cryptographic algorithm.

The present disclosure adopts the following technical solutions:

There is provided a method for secure file sharing based on a domestic cryptographic algorithm, the method being applied to a communication system including a file sharing user terminal A, a file receiving user terminal B, and a key management center, the method for file sharing including the following steps:
  S1: registering, by a user, at a file sharing user terminal A and a file receiving user terminal B to generate corresponding usernames a and b, and sending, by the file sharing user terminal A and the file receiving user terminal B, registration information of the user to the key management center, where 1024 public keys are preset in each of the file sharing user terminal A and the file receiving user terminal B and form a 32×32 public key matrix, 1024 private keys are preset in the key management center and form a 32×32 private key matrix, and the 1024 private keys in the key management center and the 1024 public keys in each of the file sharing user terminal A and the file receiving user terminal B are in one-to-one correspondence and form a total of 1024 public and private key pairs in an asymmetric cryptographic algorithm SM2;
  S2: calculating, by the key management center, digest values of the usernames a and b with a digest algorithm SM3, combining the digest values with the private key matrix, calculating private keys sa and sb of the user with a combination algorithm, and sending the private key sa and the private key sb of the user to the file sharing user terminal A and the file receiving user terminal B, respectively;
  S3: specifying, by the user, a file f to be shared at the file sharing user terminal A, encrypting the file f to generate an encrypted shared file F, and sharing the shared file F with the file receiving user terminal B; and
  S4: receiving, by the file receiving user terminal B, the shared file F and then decrypting the shared file to obtain the file f specified to be shared.

Optionally, the combination algorithm specifically includes: decomposing a digest value of a username with a length of 32 bytes; converting a binary number of each byte into an integer, such that there are a total of 32 integers; dividing 32 by each integer and performing modulo operation to obtain a total of 32 integers from 0 to 31; adding 1 to the integer to serve as a vertical mark of a matrix, such that there are a total of 32 vertical marks; sequentially extracting the keys corresponding to the vertical marks from the public key matrix or the private key matrix, such that there are a total of 32 keys; and adding the 32 keys to obtain a new key.

Optionally, the encryption operation in the step S3 includes the following steps:
  S3.1: specifying the file f to be shared at the file sharing user terminal A;
  S3.2: inputting a numeric password c of no more than 16 bits in the file sharing user terminal A, calculating a digest of the numeric password with the digest algorithm SM3, and taking first 16 bytes of the digest as c';
  S3.3: encrypting, by the file sharing user terminal A, the file f with a symmetric cryptographic algorithm SM4 by using c' as a key of the symmetric cryptographic algorithm SM4 to obtain a ciphertext f;
  S3.5: calculating a length L of the ciphertext f, where L is represented by a length of 4 bytes;
  S3.6: inputting, in the file sharing user terminal A, the username b registered by the user at the file receiving user terminal B, calculating a public key pb of the username b with the combination algorithm, and encrypting c' with the public key pb to obtain a ciphertext c";
  S3.7: combining L, the ciphertext f, and the ciphertext c", and calculating, by the file sharing user terminal A, a digest of L+f+c" with the digest algorithm SM3 to obtain the digest;
  S3.8: digitally signing, by the file sharing user terminal A, the digest with the asymmetric cryptographic algorithm SM2 and the private key sa to obtain a signature value s;
  S3.9: combining, by the file sharing user terminal A, L+f+r"+s into the new shared file F, and sharing the shared file F with the file receiving user terminal B; and
  S3.10: informing, by the file sharing user terminal A, a sharing user of the numeric password c in other offline modes.

Optionally, the decryption operation in the step S4 includes the following steps:
  S4.1: receiving, by the file receiving user terminal B, the shared file F, then specifying the file F and inputting the username a registered at the file sharing user terminal A, and calculating, by the file receiving user terminal B, a public key pa with the combination algorithm by using the input username a;
  S4.2: calculating, by the file receiving user terminal B, a digest of L+f+c" with the digest algorithm SM3, and performing signature verification on a signature value s using a digest value, the asymmetric cryptographic algorithm SM2, and the public key pa: when the verification succeeds, proceeding to a next step, or if the verification fails, indicating that the file has a security risk, and when the number of times at which the verification fails reaches a predetermined number of times, executing a re-encryption operation on the file F and giving an alarm to prompt the user;

S4.3: inputting, by the file receiving user terminal B, a numeric password, calculating a digest, obtaining first 16 bytes of the digest, extracting c" from an (L+1)th byte in the file F, decrypting c" with the private key sb to obtain c' in the file, and comparing a value of the first 16 bytes of the digest with a value of c': if the values are consistent, proceeding to a next step, or if the values are inconsistent, prompting the user to re-input the numeric password, and when the number of times at which the numeric password is input wrongly reaches a predetermined number of times, executing a re-encryption operation on the file F and giving an alarm to prompt the user; and S4.4: decrypting, by the file receiving user terminal B, content of f by using c' as a symmetric key of a symmetric cryptographic algorithm SM4 to generate a decrypted plaintext file f, to complete the sharing of the file f.

Optionally, the re-encryption operation in the steps S4.2 and S4.3 specifically includes: when the number of times at which the verification fails or the numeric password is input wrongly reaches the predetermined number of times, giving an alarm to remind the user that the file has been corrupted and is incapable of continuing to be decrypted; generating, by the file receiving user terminal B, a random number R; and encrypting the file F with the symmetric cryptographic algorithm SM4 by using R as the key of the symmetric cryptographic algorithm SM4, such that the file F is incapable of continuing to be decrypted.

Optionally, when there are a plurality of file receiving user terminals B, the file sharing user terminal A shares the specified file with the plurality of file receiving user terminals B; usernames of the plurality of file receiving user terminals B are b1, . . . , and bn, respectively, where n is greater than 1; and during the encryption operation in the step S3, the usernames b1, . . . , and bn are input in the file sharing user terminal A, public keys pb1, . . . , and pbn of the usernames b1, . . . , and bn are calculated with the combination algorithm, respectively, c' is encrypted with the public keys pb1, . . . , and pbn to obtain ciphertexts cb1', . . . , and cbn', cb1', . . . , and cbn' are added into the shared file F, and the number of users of the shared file is specified at a file header, that is, F=n+L+f+cB'+s, where cB'=cb1'+ . . . +cbn'.

There is provided a system for secure file sharing based on a domestic cryptographic algorithm, the system for file sharing including a file sharing user terminal A, a file receiving user terminal B, and a key management center, where 1024 public keys are preset in each of the file sharing user terminal A and the file receiving user terminal B and form a 32×32 public key matrix, 1024 private keys are preset in the key management center and form a 32×32 private key matrix, and the 1024 private keys in the key management center and the 1024 public keys in each of the file sharing user terminal A and the file receiving user terminal B are in one-to-one correspondence and form a total of 1024 public and private key pairs in an asymmetric cryptographic algorithm SM2; and the system for file sharing shares a specified file by any one of the methods for file sharing as described above.

The present disclosure has the beneficial effects that the file sharing user terminal A does not need to specify an encryption key by itself, nor does it need to memorize or spread the encryption key to the file receiving user terminal B by other means, which avoids the problem of key leakage and ensures the security during file transmission, such that file content is prevented from being stolen or tampered with. If the shared file is tampered with or a file source is illegal, the file receiving user terminal B can be aware of it and makes a corresponding determination. The reliability of discovering that the shared file is tampered with or the source is illegal is determined by the characteristics of the asymmetric algorithm and the digest algorithm. After a non-sharing user gets the shared file F, the file content cannot be decrypted. The file sharing user terminal A can share the file with multiple users at the same time, without spreading the encryption key to the multiple users at the same time. Only the specified sharing user can see the file content, while others cannot check the file content after getting the file.

BRIEF DESCRIPTION OF THE DRAWINGS

FIG. 1 is a schematic diagram of a communication relationship among a file sharing user terminal A, a file receiving user terminal B, and a key management center in the present disclosure;

FIG. 2 is a schematic diagram of a public key matrix in the present disclosure; and FIG. 3 is a schematic diagram of a private key matrix in the present disclosure.

DETAILED DESCRIPTION OF THE EMBODIMENTS

To make the objective, the technical solutions and advantages of the present disclosure clearer, the present disclosure is further described in detail below in conjunction with the accompanying drawings and the embodiments. It should be understood that the specific embodiments described herein are only for explaining but not for limiting the present disclosure.

Embodiment 1

As shown in FIG. 1, there is provided a method for secure file sharing based on a domestic cryptographic algorithm, the method being applied to a communication system including a file sharing user terminal A, a file receiving user terminal B, and a key management center, the method for file sharing including the following steps:

S1: registering, by a user, at a file sharing user terminal A and a file receiving user terminal B to generate corresponding usernames a and b, and sending, by the file sharing user terminal A and the file receiving user terminal B, registration information of the user to the key management center, where 1024 public keys are preset in each of the file sharing user terminal A and the file receiving user terminal B and form a 32×32 public key matrix as shown in FIG. 2, 1024 private keys are preset in the key management center and form a 32×32 private key matrix as shown in FIG. 3, and the 1024 private keys in the key management center and the 1024 public keys in each of the file sharing user terminal A and the file receiving user terminal B are in one-to-one correspondence and form a total of 1024 public and private key pairs in an asymmetric cryptographic algorithm SM2;

S2: calculating, by the key management center, digest values (lengths of 32 bytes) of the usernames a and b with a digest algorithm SM3, combining the digest values with the private key matrix, calculating private keys sa and sb of the user with a combination algorithm, and sending the private key sa and the private key sb of the user to the file sharing user terminal A and the file receiving user terminal B, respectively, where the combination algorithm specifically includes: decomposing a digest value of a username with a length of 32 bytes; converting a binary number of each byte into an integer (0-255), such that there are a total of 32 integers; dividing 32 by each integer and performing modulo operation to obtain a total of 32 integers from 0 to 31; adding 1 to the integer to serve as a vertical mark of a matrix, such that there are a total of 32 vertical marks; sequentially extracting the keys corresponding to the vertical marks from the public key matrix or the private key matrix, such that there are a total of 32 keys; and adding the 32 keys to obtain a new key;

S3: specifying, by the user, a file f to be shared at the file sharing user terminal A, encrypting the file f to generate an encrypted shared file F, and sharing the shared file F with the file receiving user terminal B; and S4: receiving, by the file receiving user terminal B, the shared file F and then decrypting the shared file to obtain the file f specified to be shared.

The encryption operation in the step S3 includes the following steps:

S3.1: specifying the file f to be shared at the file sharing user terminal A;

S3.2: inputting a numeric password c of no more than 16 bits in the file sharing user terminal A, calculating a digest of the numeric password with the digest algorithm SM3, and taking first 16 bytes of the digest as c';

S3.3: encrypting, by the file sharing user terminal A, the file f with a symmetric cryptographic algorithm SM4 by using c' as a key of the symmetric cryptographic algorithm SM4 to obtain a ciphertext f;

S3.5: calculating a length L of the ciphertext f, where L is represented by a length of 4 bytes;

S3.6: inputting, in the file sharing user terminal A, the username b registered by the user at the file receiving user terminal B, calculating a public key pb of the username b with the combination algorithm, and encrypting c' with the public key pb to obtain a ciphertext c";

S3.7: combining L, the ciphertext f, and the ciphertext c", and calculating, by the file sharing user terminal A, a digest of L+f+c" with the digest algorithm SM3 to obtain the digest;

S3.8: digitally signing, by the file sharing user terminal A, the digest with the asymmetric cryptographic algorithm SM2 and the private key sa to obtain a signature value s;

S3.9: combining, by the file sharing user terminal A, L+f+r"+s into the new shared file F, and sharing the shared file F with the file receiving user terminal B through network transmission or readable medium copying; and S3.10: informing, by the file sharing user terminal A, a sharing user of the numeric password c in other offline modes.

The decryption operation in the step S4 includes the following steps:

S4.1: receiving, by the file receiving user terminal B, the shared file F, then specifying the file F and inputting the username a registered at the file sharing user terminal A, and calculating, by the file receiving user terminal B, a public key pa with the combination algorithm by using the input username a;

S4.2: calculating, by the file receiving user terminal B, a digest of L+f+c" with the digest algorithm SM3, and performing signature verification on a signature value s using a digest value, the asymmetric cryptographic algorithm SM2, and the public key pa: when the verification succeeds, proceeding to a next step, or if the verification fails, indicating that the file has a security risk, and when the number of times at which the verification fails reaches a predetermined number of times, executing a re-encryption operation on the file F and giving an alarm to prompt the user;

S4.3: inputting, by the file receiving user terminal B, a numeric password, calculating a digest, obtaining first 16 bytes of the digest, extracting c" from an (L+1)th byte in the file F, decrypting c" with the private key sb to obtain c' in the file, and comparing a value of the first 16 bytes of the digest with a value of c': if the values are consistent, proceeding to a next step, or if the values are inconsistent, prompting the user to re-input the numeric password, and when the number of times at which the numeric password is input wrongly reaches a predetermined number of times, executing a re-encryption operation on the file F and giving an alarm to prompt the user; and S4.4: decrypting, by the file receiving user terminal B, content of f by using c' as a symmetric key of a symmetric cryptographic algorithm SM4 to generate a decrypted plaintext file f, to complete the sharing of the file f.

The re-encryption operation in the steps S4.2 and S4.3 specifically includes: when the number of times at which the verification fails or the numeric password is input wrongly reaches the predetermined number of times (the number of times can be remotely configured by the key management center), giving an alarm to remind the user that the file has been corrupted and is incapable of continuing to be decrypted; generating, by the file receiving user terminal B, a random number R; and encrypting the file F with the symmetric cryptographic algorithm SM4 by using R as the key of the symmetric cryptographic algorithm SM4, such that the file F is incapable of continuing to be decrypted.

In another embodiment, when there are a plurality of file receiving user terminals B, the file sharing user terminal A shares the specified file with the plurality of file receiving user terminals B; usernames of the plurality of file receiving user terminals B are b1, . . . , and bn, respectively, where n is greater than 1; and during the encryption operation in the step S3, the usernames b1, . . . , and bn are input in the file sharing user terminal A, public keys pb 1, . . . , and pbn of the usernames b1, . . . , and bn are calculated with the combination algorithm, respectively, c' is encrypted with the public keys pb1, . . . , and pbn to obtain ciphertexts cb1', . . . , and cbn', cb1', . . . , and cbn' are added into the shared file F, and the number of users of the shared file is specified at a file header, that is, F=n+L+f+cB'+s, where cB'=cb1'+ . . . +cbn'.

As shown in FIG. 1, there is provided a system for secure file sharing based on a domestic cryptographic algorithm, the system for file sharing including a file sharing user terminal A, a file receiving user terminal B, and a key management center, where 1024 public keys are preset in each of the file sharing user terminal A and the file receiving user terminal B and form a 32×32 public key matrix, 1024 private keys are preset in the key management center and form a 32×32 private key matrix, and the 1024 private keys in the key management center and the 1024 public keys in each of the file sharing user terminal A and the file receiving user terminal B are in one-to-one correspondence and form a total of 1024 public and private key pairs in an asymmetric cryptographic algorithm SM2; and the system for file sharing shares a specified file by the method for file sharing as described above.

It can be understood that names of the above file sharing user terminal A and file receiving user terminal B are only used to illustrate the technical solutions of the present disclosure. The file sharing user terminal A and the file receiving user terminal B may be a same type of user terminal equipment. During actual operation, the file receiving user terminal B may share the specified file with the file sharing user terminal A or other file receiving user terminals B by the method for file sharing as above.

The three types of cryptographic algorithms, i.e., the asymmetric cryptographic algorithm SM2, the symmetric cryptographic algorithm SM4, and the digest algorithm SM3 used in the present disclosure are domestic cryptographic algorithms and will not be repeated herein.

The present disclosure has the beneficial effects that the file sharing user terminal A does not need to specify an encryption key by itself, nor does it need to memorize or spread the encryption key to the file receiving user terminal B by other means, which avoids the problem of key leakage and ensures the security during file transmission, such that file content is prevented from being stolen or tampered with. If the shared file is tampered with or a file source is illegal, the file receiving user terminal B can be aware of it and makes a corresponding determination. The reliability of discovering that the shared file is tampered with or the source is illegal is determined by the characteristics of the asymmetric algorithm and the digest algorithm. After a non-sharing user gets the shared file F, the file content cannot be decrypted. The file sharing user terminal A can share the file with multiple users at the same time, without spreading the encryption key to the multiple users at the same time. Only the specified sharing user can see the file content, while others cannot check the file content after getting the file.

The invention claimed is:

1. A method for secure file sharing based on a domestic cryptographic algorithm, the method being applied to a communication system comprising a file sharing user terminal A, a file receiving user terminal B, and a key management center, the method for file sharing comprising the following steps:
   S1: registering, by a user, at a file sharing user terminal A and a file receiving user terminal B to generate corresponding usernames a and b, and sending, by the file sharing user terminal A and the file receiving user terminal B, registration information of the user to the key management center, wherein 1024 public keys are preset in each of the file sharing user terminal A and the file receiving user terminal B and form a 32×32 public key matrix, 1024 private keys are preset in the key management center and form a 32×32 private key matrix, and the 1024 private keys in the key management center and the 1024 public keys in each of the file sharing user terminal A and the file receiving user terminal B are in one-to-one correspondence and form a total of 1024 public and private key pairs in an asymmetric cryptographic algorithm SM2;
   S2: calculating, by the key management center, digest values of the usernames a and b with a digest algorithm SM3, combining the digest values with the private key matrix, calculating private keys sa and sb of the user with a combination algorithm, and sending the private key sa and the private key sb of the user to the file sharing user terminal A and the file receiving user terminal B, respectively;
   S3: specifying, by the user, a file f to be shared at the file sharing user terminal A, encrypting the file f to generate an encrypted shared file F, and sharing the shared file F with the file receiving user terminal B; and
   S4: receiving, by the file receiving user terminal B, the shared file F and then decrypting the shared file to obtain the file f specified to be shared.

2. The method for secure file sharing based on a domestic cryptographic algorithm according to claim 1, wherein the combination algorithm specifically comprises: decomposing a digest value of a username with a length of 32 bytes; converting a binary number of each byte into an integer, such that there are a total of 32 integers; dividing 32 by each integer and performing modulo operation to obtain a total of 32 integers from 0 to 31; adding 1 to the integer to serve as a vertical mark of a matrix, such that there are a total of 32 vertical marks; sequentially extracting the keys corresponding to the vertical marks from the public key matrix or the private key matrix, such that there are a total of 32 keys; and adding the 32 keys to obtain a new key.

3. The method for secure file sharing based on a domestic cryptographic algorithm according to claim 2, wherein the encryption operation in the step S3 comprises the following steps:
   S3.1: specifying the file f to be shared at the file sharing user terminal A;
   S3.2: inputting a numeric password c of no more than 16 bits in the file sharing user terminal A, calculating a digest of the numeric password with the digest algorithm SM3, and taking first 16 bytes of the digest as c';
   S3.3: encrypting, by the file sharing user terminal A, the file f with a symmetric cryptographic algorithm SM4 by using c' as a key of the symmetric cryptographic algorithm SM4 to obtain a ciphertext f;
   S3.5: calculating a length L of the ciphertext f, wherein L is represented by a length of 4 bytes;
   S3.6: inputting, in the file sharing user terminal A, the username b registered by the user at the file receiving user terminal B, calculating a public key pb of the username b with the combination algorithm, and encrypting c' with the public key pb to obtain a ciphertext c";
   S3.7: combining L, the ciphertext f, and the ciphertext c", and calculating, by the file sharing user terminal A, a digest of L+f+c" with the digest algorithm SM3 to obtain the digest;
   S3.8: digitally signing, by the file sharing user terminal A, the digest with the asymmetric cryptographic algorithm SM2 and the private key sa to obtain a signature value s;
   S3.9: combining, by the file sharing user terminal A, L+f+r"+s into the new shared file F, and sharing the shared file F with the file receiving user terminal B; and
   S3.10: informing, by the file sharing user terminal A, a sharing user of the numeric password c in other offline modes.

4. The method for secure file sharing based on a domestic cryptographic algorithm according to claim 3, wherein when there are a plurality of file receiving user terminals B, the file sharing user terminal A shares the specified file with the plurality of file receiving user terminals B; usernames of the plurality of file receiving user terminals B are b1, . . . , and bn, respectively, wherein n is greater than 1; and during the encryption operation in the step S3, the usernames b1, . . . , and bn are input in the file sharing user terminal A, public keys pb1, . . . , and pbn of the usernames b1, . . . , and bn are calculated with the combination algorithm, respectively, c' is encrypted with the public keys pb1, . . . , and pbn to obtain ciphertexts cb1', . . . , and cbn', cb1', . . . , and cbn' are added into the shared file F, and the number of users of the shared file is specified at a file header, that is, F=n+L+f+cB'+s, wherein cB'=cb1'+ . . . +cbn'.

5. The method for secure file sharing based on a domestic cryptographic algorithm according to claim 2, wherein the decryption operation in the step S4 comprises the following steps:
S4.1: receiving, by the file receiving user terminal B, the shared file F, then specifying the file F and inputting the username a registered at the file sharing user terminal A, and calculating, by the file receiving user terminal B, a public key pa with the combination algorithm by using the input username a;
S4.2: calculating, by the file receiving user terminal B, a digest of L+f+c" with the digest algorithm SM3, and performing signature verification on a signature value s using a digest value, the asymmetric cryptographic algorithm SM2, and the public key pa: when the verification succeeds, proceeding to a next step, or if the verification fails, indicating that the file has a security risk, and when the number of times at which the verification fails reaches a predetermined number of times, executing a re-encryption operation on the file F and giving an alarm to prompt the user;
S4.3: inputting, by the file receiving user terminal B, a numeric password, calculating a digest, obtaining first 16 bytes of the digest, extracting c" from an (L+1)th byte in the file F, decrypting c" with the private key sb to obtain c' in the file, and comparing a value of the first 16 bytes of the digest with a value of c': if the values are consistent, proceeding to a next step, or if the values are inconsistent, prompting the user to re-input the numeric password, and when the number of times at which the numeric password is input wrongly reaches a predetermined number of times, executing a re-encryption operation on the file F and giving an alarm to prompt the user; and
S4.4: decrypting, by the file receiving user terminal B, content of f by using c' as a symmetric key of a symmetric cryptographic algorithm SM4 to generate a decrypted plaintext file f, to complete the sharing of the file f.

6. The method for secure file sharing based on a domestic cryptographic algorithm according to claim 5, wherein the re-encryption operation in the steps S4.2 and S4.3 specifically comprises: when the number of times at which the verification fails or the numeric password is input wrongly reaches the predetermined number of times, giving an alarm to remind the user that the file has been corrupted and is incapable of continuing to be decrypted; generating, by the file receiving user terminal B, a random number R; and encrypting the file F with the symmetric cryptographic algorithm SM4 by using R as the key of the symmetric cryptographic algorithm SM4, such that the file F is incapable of continuing to be decrypted.

7. A system for secure file sharing based on a domestic cryptographic algorithm, comprising:
a file sharing user terminal A,
a file receiving user terminal B, and
a key management center, wherein
1024 public keys are preset in each of the file sharing user terminal A and the file receiving user terminal B and form a 32×32 public key matrix,
1024 private keys are preset in the key management center and form a 32×32 private key matrix,
the 1024 private keys in the key management center and the 1024 public keys in each of the file sharing user terminal A and the file receiving user terminal B are in one-to-one correspondence and form a total of 1024 public and private key pairs in an asymmetric cryptographic algorithm SM2, and
the system for secure file sharing shares a specified file by:
S1: registering, by the file sharing user terminal A and the file receiving user terminal B to generate corresponding usernames a and b, and sending, by the file sharing user terminal A and the file receiving user terminal B, registration information of a user to the key management center;
S2: calculating, by the key management center, digest values of the usernames a and b with a digest algorithm SM3, combining the digest values with the private key matrix, calculating private keys sa and sb of the user with a combination algorithm, and sending the private key sa and the private key sb of the user to the file sharing user terminal A and the file receiving user terminal B, respectively;
S3: specifying a file f to be shared by the file sharing user terminal A, encrypting the file f to generate an encrypted shared file F, and sharing the shared file F with the file receiving user terminal B; and
S4: receiving, by the file receiving user terminal B, the shared file F and then decrypting the shared file to obtain the file f specified to be shared.

* * * * *